(12) United States Patent
Kawakami et al.

(10) Patent No.: US 9,522,787 B2
(45) Date of Patent: Dec. 20, 2016

(54) APPARATUS FOR SUPPLYING GRANULAR MATERIAL, AND APPARATUS FOR BLENDING AND SUPPLYING GRANULAR MATERIAL EQUIPPED THEREWITH

(71) Applicant: Kabushiki Kaisha Matsui Seisakusho, Osaka-shi, Osaka (JP)

(72) Inventors: Hajime Kawakami, Hirakata (JP); Hiroshi Hara, Hirakata (JP)

(73) Assignee: Kabushiki Kaisha Matsui Seisakusho, Osaka-shi, Osaka ( * ) Notice: Subject to any disclaimer, the term of this patent is extended or adjusted under 35 U.S.C. 154(b) by 130 days.

(21) Appl. No.: 14/232,845

(22) PCT Filed: Sep. 24, 2012

(86) PCT No.: PCT/JP2012/074336
§ 371 (c)(1),
(2) Date: Jan. 14, 2014

(87) PCT Pub. No.: WO2013/047406
PCT Pub. Date: Apr. 4, 2013

(65) Prior Publication Data
US 2014/0166440 A1    Jun. 19, 2014

(30) Foreign Application Priority Data

Sep. 27, 2011 (JP) .................. 2011-210047

(51) Int. Cl.
*B60P 1/42* (2006.01)
*B65G 37/00* (2006.01)
(Continued)

(52) U.S. Cl.
CPC ............... *B65G 37/00* (2013.01); *B65G 33/08* (2013.01); *B65G 65/46* (2013.01); *B65G 23/26* (2013.01)

(58) Field of Classification Search
CPC ......................................................... B60P 1/42
(Continued)

(56) References Cited

U.S. PATENT DOCUMENTS 1,767,248 A * 6/1930 Leach ....................... F23K 3/14
110/286
4,875,820 A * 10/1989 Lepp .................... B65G 65/466
198/550.1

FOREIGN PATENT DOCUMENTS

JP    H7-291457    11/1995
JP    H10-129845    5/1998
(Continued)

*Primary Examiner* — Gene Crawford
*Assistant Examiner* — Lester Rushin
(74) *Attorney, Agent, or Firm* — Norton Rose Fulbright US LLP (57) ABSTRACT

An apparatus for supplying granular material, comprising a storing unit for storing granular material, a feeding unit for feeding granular material stored in the storing unit to a supply destination, a driving unit coupled to the feeding unit for driving the feeding unit, and a supporting unit forming a space for receiving the feeding unit, supporting the storing unit, the feeding unit and the driving unit, and being fixed to an object to be installed. The driving unit is supported by the supporting unit so as to be freely displaced between a coupling position where the driving unit is coupled to the feeding unit and a retracting position where coupling of the driving unit with the feeding unit is released and the feeding unit is removable from the supporting unit.

9 Claims, 6 Drawing Sheets (51) Int. Cl.
 *B65G 65/46* (2006.01)
 *B65G 33/08* (2006.01)
 *B65G 23/26* (2006.01)
(58) Field of Classification Search
 USPC ............... 198/548, 550.2, 550.1, 550.6, 658, 670,198/674
 See application file for complete search history.

(56) References Cited

FOREIGN PATENT DOCUMENTS

| | | |
|---|---|---|
| JP | P2002-19966 A | 1/2002 |
| JP | P2006-168083 A | 6/2006 |
| JP | P2010-112791 A | 5/2010 |
| JP | P2011-111250 A | 6/2011 |

* cited by examiner

APPARATUS FOR SUPPLYING GRANULAR MATERIAL, AND APPARATUS FOR BLENDING AND SUPPLYING GRANULAR MATERIAL EQUIPPED THEREWITH

TECHNICAL FIELD

The present invention relates to an apparatus for supplying granular material wherein a feeding unit is provided under a storing unit for storing granular material and granular material is supplied to a supply destination by driving the feeding unit, and also relates to an apparatus for blending and supplying granular material equipped with the supplying apparatus.

BACKGROUND ART

A well-known conventional apparatus is provided for supplying granular material in which a feeding unit such as a screw feeder or a rotary feeder is provided under a storing unit for storing granular material and granular material is supplied by driving the feeding unit (refer to the following Patent Literature 1).

CITATION LIST

Patent Literature

PTL 1: JP2010-112791A

SUMMARY OF INVENTION

Technical Problem

The above-mentioned apparatus for supplying granular material is fixed to a pedestal or a supply tube such as a chute for supplying granular material to a supply destination. When granular material to be supplied to the destination is changed, cleaning is required for inhibiting contamination. Particularly, granular material and the fine powders are easily attached on the feeding unit. The feeding unit is connected to the driving unit for driving the feeding unit and is fixed to an object to be installed, so that there is such a problem that cleaning is difficult. In addition, large-scale operation is required for maintenance and replacement of the feeding unit.

The present invention is proposed in view of the above-mentioned problems. The present invention has an object to provide an apparatus for supplying granular material capable of improving efficiency in cleaning, maintenance and replacement and to provide an apparatus for blending and supplying granular material equipped with the supplying apparatus.

Solution to Problem

In order to achieve the above-mentioned objects, the apparatus for supplying granular material of the present invention comprises a storing unit for storing granular material; a feeding unit for feeding granular material stored in the storing unit to a supply destination; a driving unit coupled to the feeding unit for driving the feeding unit; and a supporting unit forming a space for receiving the feeding unit, supporting the storing unit, the feeding unit and the driving unit, and being fixed to an object to be installed. The apparatus for supplying granular material is characterized in that the driving unit is supported by the supporting unit so as to be freely displaced between a coupling position where the driving unit is coupled to the feeding unit and a retracting position where coupling of the driving unit with the feeding unit is released and the feeding unit is removable from the supporting unit.

In the apparatus for supplying granular material of the present invention as mentioned above, the driving unit coupled with the feeding unit for driving the feeding unit is supported by the supporting unit so as to be freely displaced between the coupling position and the retracting position. When the driving unit is at the retracting position, the feeding unit is able to be easily detached from the supporting unit fixed to an object to be installed, thereby improving efficiency in cleaning, maintenance and replacement of the feeding unit. Operation is able to be executed without detaching the driving unit connected to the control panel with an electric power line or a signal line from the supporting unit, thereby further improving the efficiency.

In the present invention, the feeding unit can be continuously connected with a residual material removing portion provided with a residual material removing hole and an open-close member for opening or closing the residual material removing hole. In such a configuration, the residual material removing portion and the feeding unit are able to be detached from the supporting unit. For example, compared with the embodiment in which the residual material removing portion is separately provided from the supporting unit, cleaning of the residual material removing portion to which granular material and minute powder are easily attached is able to be facilitated.

In the present invention, a part of the driving unit can be rotatably coupled to the supporting unit via a coupling member so that the driving unit can be displaced between the coupling position and the retracting position.

In such a configuration, compared with the embodiment in which the driving unit is slidable relative to the supporting unit between the coupling position and the retracting position, a space required for detaching the feeding unit is able to be reduced. In addition, compared with the slidable embodiment, contact of the feeding unit and the driving unit is effectively inhibited when the feeding unit is detached. Namely, when the driving unit is adapted to be slidable relative to the supporting unit between the coupling position and the retracting position, the driving unit is required to retract by largely sliding relative to the supporting unit for inhibiting contact of the feeding unit and the driving unit at the time of detaching the feeding unit. On the other hand, in the above-mentioned configuration, the driving unit is rotated around the part to be at the retracting position. Therefore, the driving unit does not become an obstacle at the retracting position. When the feeding unit is detached, the space required for detaching the feeding unit is reduced. In addition, contact of the feeding unit and the driving unit is effectively avoided.

In the present invention, the feeding unit can be fixedly provided so as to be connected on a downstream side of the storing unit, and the storing unit and the feeding unit can be detachably supported to the supporting unit; and the storing unit and the feeding unit can be removed from the supporting unit when the driving unit is at the retracting position.

In such a configuration, the storing unit, together with the feeding unit, is able to be detached from the supporting unit, thereby facilitating cleaning in the storing unit. When the feeding unit and the storing unit are constituted as the storing-feeding unit with a plurality of storing-feeding units prepared, the storing-feeding unit is provided for the supporting unit and the driving unit supported by the supporting unit so as to be exchangeable like a cassette, thereby improving efficiency in material exchange.

In the present invention, the feeding unit can be provided with a screw portion having a screw which is connected to the driving unit and is rotatably driven, and a screw housing portion housing the screw portion and having a supply port; and the screw housing portion and the screw portion can have an engagement portion, respectively, the engagement portions engaging the screw housing portion and the screw portion and being capable of removing the screw portion from the screw housing portion by releasing the engagement.

In such a configuration, the feeding unit is able to be detached from the supporting unit, and the screw portion having the screw is able to be easily detached from the screw housing, thereby facilitating cleaning in the screw housing and the screw portion. In addition, efficiency in maintenance and replacement of the screw portion is further improved because the screw portion is easily detached from the screw housing. Furthermore, the screw portion is prevented from unintentional detachment from the screw housing when the feeding unit is detached from the supporting unit.

Furthermore, in the present invention, in order to achieve the above-mentioned objects, the apparatus for blending and supplying granular material of the present invention can be provided with a plurality of the apparatuses for supplying granular material as mentioned above and a supply tube which receives granular material fed from a feeding unit of the apparatus for supplying granular material and supplies the received granular material.

The above-mentioned blending and supplying apparatus of the present invention is able to improve efficiency in cleaning, maintenance and replacement, thereby being a preferable blending and supplying apparatus for plural kinds of granular material in which material exchange is frequently executed.

Advantageous Effects of Invention

The apparatus for supplying granular material and the apparatus for blending and supplying granular material equipped with the supplying apparatus as mentioned above are capable of improving efficiency in cleaning, maintenance and replacement.

DESCRIPTION OF EMBODIMENTS

An embodiment of the present invention is explained referring to the attached drawings.

In some figures, some of the reference numbers allotted to other figures are not shown.

In FIG. 4, a part of the figure is shown as a plan view, not a sectional view.

Regarding the direction, facing the front view in FIG. 5 as a standard, expressions of directions such as front and back or right and left are used for brevity in the following description of an embodiment. FIG. 1 to FIG. 6 explain an example of an apparatus for supplying granular material and an apparatus for blending and supplying granular material equipped with the supplying apparatus of the present embodiment.

Figure 5:
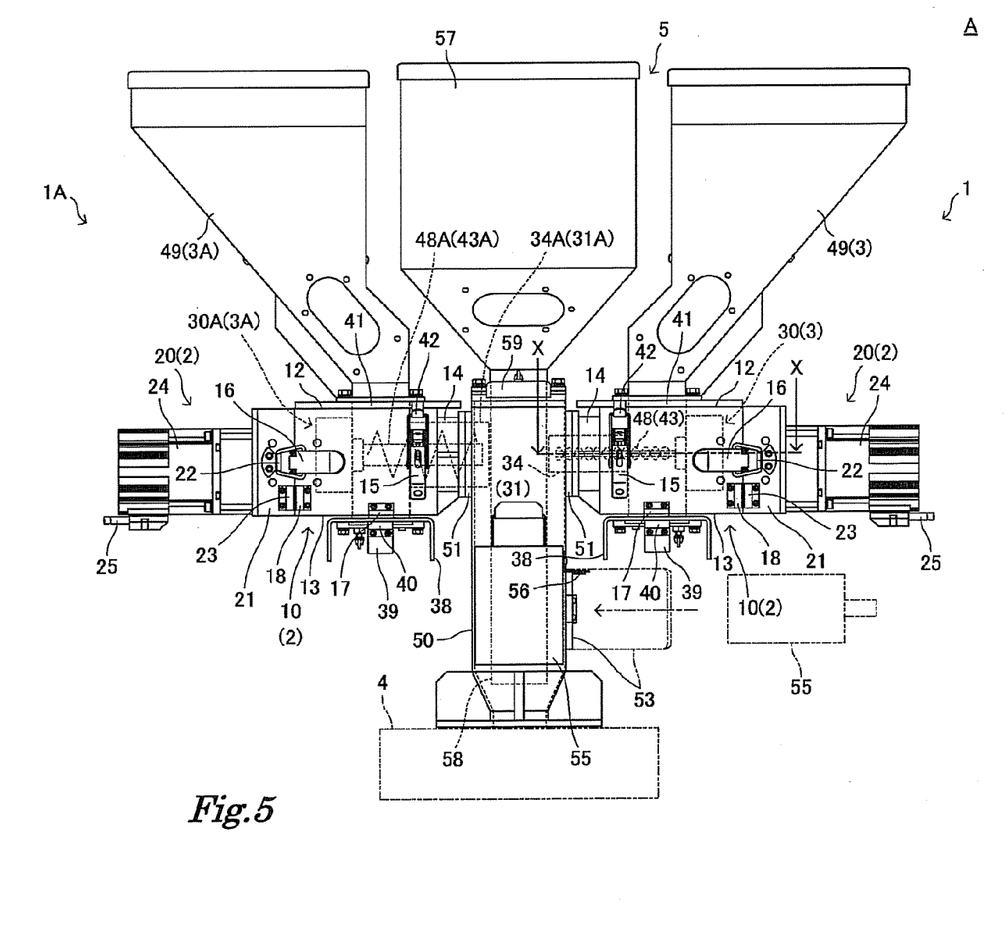
FIG. 5 is a diagrammatic front view of the apparatus for blending and supplying granular material.
Figure 6:
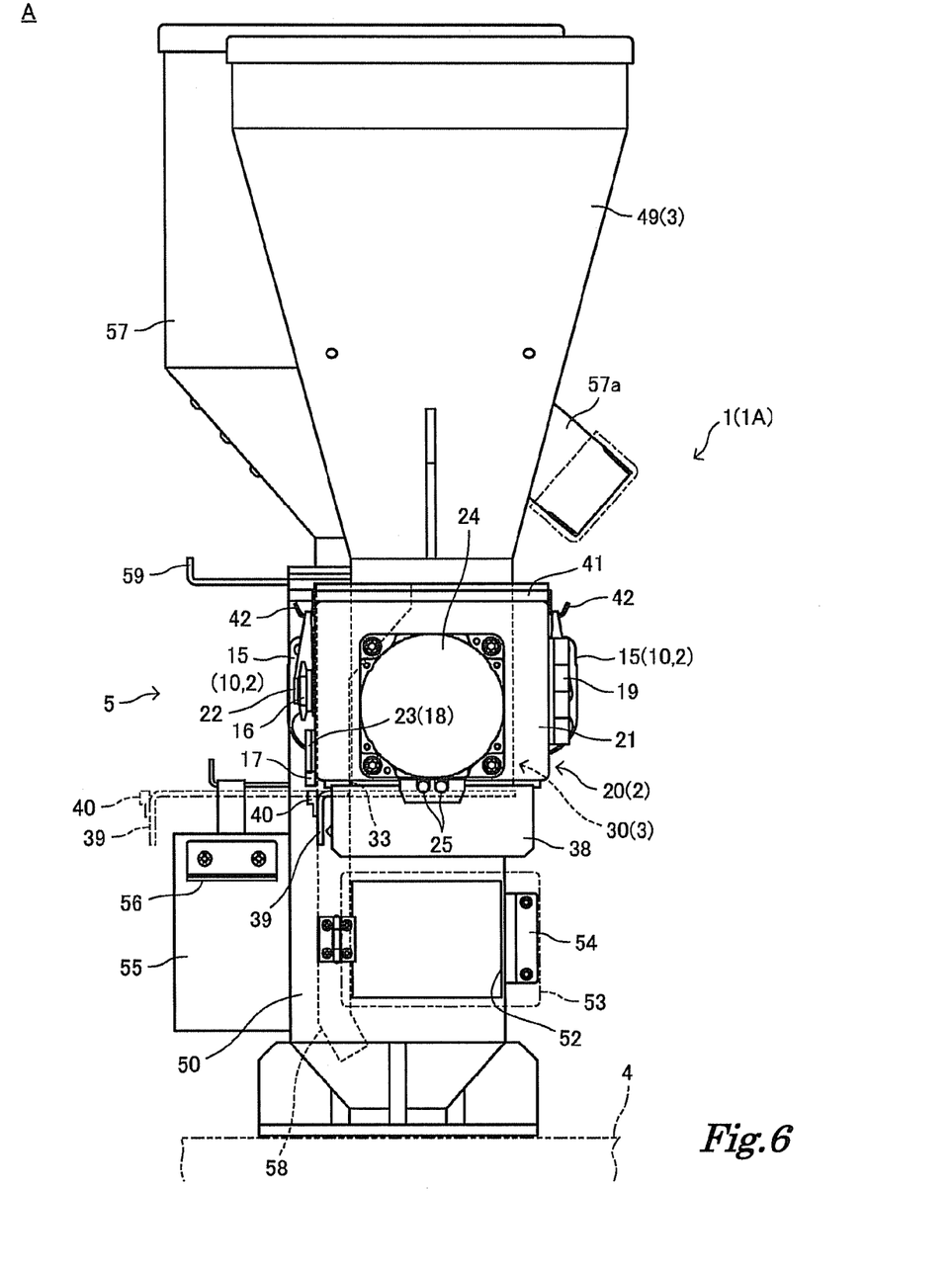
FIG. 6 is a diagrammatic side view of the apparatus for blending and supplying granular material.

As shown in FIG. 5 and FIG. 6, an apparatus for blending and supplying granular material A of the present embodiment has a plurality of apparatuses for supplying granular material (two in the FIGS. 1, 1A for storing and supplying (feeding) different kinds of granular material, respectively, and a blending apparatus main body 5, an object to be installed, to which the supplying apparatuses 1, 1A are fixed. Specific configuration of the supplying apparatuses 1, 1A is explained later.

The blending apparatus main body 5 has a single supply tube 50 which receives granular material supplied from the supplying apparatuses 1, 1A and constitutes a supply destination of the supplying apparatuses 1, 1A. The blending apparatus main body 5 also has a main storing unit 57 for storing granular material different from the material stored in the supplying apparatuses 1, 1A.

The above-mentioned granular material refers to powdered or granular material and includes minute and thin flake material, short-fiber flake material, or slivered material.

The above-mentioned material may be any material such as synthetic resin like resin pellet or resin fiber flake, metal, semiconducting material, wood, drug material, or food material.

Granular material includes, for example, natural material (virgin material), pulverized material, master batch material, and several kinds of additive agent when a synthetic resin mold is produced. In case of the blending and supplying apparatus A equipped with two supplying apparatuses 1, 1A and the main storing unit 57 as shown in the figures, main material such as natural material can be stored in the main storing unit 57, an additive agent such as master batch material can be stored in one supplying apparatus 1, and pulverized material can be stored in another supplying apparatus 1A.

The blending and supplying apparatus A is constructed so as to supply granular material supplied from the supplying apparatuses 1, 1A and the main storing unit 57 to the supply destination, such as an injection molding machine 4, of the blending and supplying apparatus A via the supply tube 50 as shown in FIG. 5 and FIG. 6. In this embodiment, the blending and supplying apparatus A is directly provided on the injection molding machine 4 and is incorporated into a blending and supplying system of granular material in which plural kinds of granular material are blended in a predetermined blend ratio and are supplied to the destination, the injection molding machine 4.

The injection molding machine 4 is not explained in detail. The injection molding machine 4 is constructed such that granular material fed from a material feed port via the supply tube 50 of the blending and supplying apparatus A is melt in a cylinder and one shot of the melted resin is injected to a mold (not shown) from a nozzle at the tip end of the cylinder, thereby molding a resin product.

The supply destination is not limited to the injection molding machine for molding a synthetic resin product. The supply destination includes an injection molding machine for molding other material, an extruder or a compression molding machine for several kinds of material, and so on.

The supply destination also includes a charge hopper as a temporary storing unit which is provided in a previous stage of the molding machine. In addition, the supply destination includes a collector connected to one end of a material transport pipe for pneumatically supplying granular material, another end of the material transport pipe being connected to the supply tube 50. The supply destination is not limited to one in case of pneumatic transportation. For example, the material transport pipe can be diverged, the collectors can be connected to other ends of the diverged pipes, respectively, and these collectors can be a supply destination.

The supply tube 50 of the blending apparatus main body 5 is constituted with a vertically long tube body and is a substantially square tube body in this embodiment. The lower end of the supply tube 50 is formed like a funnel being downwardly reduced and is connected to the injection molding machine 4 in such a manner that the opening at the lower end communicates the material feed port of the injection molding machine 4.

Fixing portions 51, 51 to which the supplying apparatuses 1, 1A are fixed are provided at the upper end of the supply tube 50. In the figures, flange-like fixing portions 51, 51 are provided on right and left side walls of the supply tube 50. The fixing portions 51, 51 are formed with receive openings 51a, 51a (refer to FIG. 4) for receiving tip end tube portions 34, 34A, to be mentioned later, of screw housings 31, 31A of the feeding units 30, 30A of the supplying apparatuses 1, 1A, respectively.

The supply tube 50 is provided with a box insertion opening 52 for inserting a gauging box 55 which is inserted for receiving and gauging the granular material supplied from the supplying apparatuses 1, 1A. The figures exemplify that the box insertion opening 52 is provided at an appropriate portion along the vertical direction on one side wall of the supply tube 50. The supply tube 50 has an open-close door 53 for opening or closing the box insertion opening 52. One side of the open-close door 53 is fixedly connected in a rotatable manner to one side wall of the supply tube 50 with a connecting means such as a hinge. The supply tube 50 is formed with a push-open type latch portion 54 such as a magnet latch for engaging another side of the open-close door 53 and keeping a closed condition.

Any open-close configuration is used for the open-close door 53, as long as the box insertion opening 52 is also to be opened or closed. For example, the structure can be a magnet catch structure for keeping a closed condition of the open-close door by absorbing another side of the open-close door by a magnet or such a structure that the open-close door is kept closed when another side of the open-close door is tightened by a tightening means. In addition, a shutter-type (slide-type) or a detachable open-close door can be used.

The gauging box 55 is capable of inserting into or removing from the box insertion opening 52 and is formed like a cuboidal box of which one end is open and another end is bottomed. A handle is provided on one side wall of the gauging box 55 and another side wall is provided with a latch receiver 56 to be engaged (absorbed, or magnetically attached) to a latching portion 54 provided for the supply tube 50.

The gauging box 55, being inserted into the box insertion opening 52, is formed so as to be capable of receiving all of the granular material supplied from the supplying apparatuses 1, 1A. Namely, when the gauging box 55 is inserted into the box insertion opening 52, granular material supplied from the supplying apparatuses 1, 1A does not flow downstream by being blocked by the gauging box 55 and is contained in the gauging box 55. When the gauging box 55 is detached from the box insertion opening 52, granular material supplied from the supplying apparatuses 1, 1A flows downstream of the supply tube 50.

When the gauging box 55 is not necessary to be inserted into the box insertion opening 52, it can be held with the handle hung up on a hook provided at an appropriate portion of the blending and supplying apparatus A (side wall of the supplying tube 50 in the figures) as shown in FIG. 5 and FIG. 6.

The supply tube 50 can be provided with a gauging box sensor for detecting insertion of the gauging box 55 to the box insertion opening 52. A contact sensor such as a limit switch can be provided for the latching portion 54 as a gauge box sensor. When the open-close door 53 is not closed or the gauging box 55 is not inserted, error message is able to be outputted. The sensor is not limited to a contact sensor and includes a non-contact light sensor or a magnetic sensor.

The main storing unit 57 is connected to the upper end of the supply tube 50. An open-close shutter 59 for opening or closing the lower end opening of the main storing unit 57 is provided for a connecting portion of the supply tube 50 and the main storing unit 57. The main storing unit 57 is in the form of a hopper of which lower diameter is gradually reduced. The lower end of the main storing unit 57 is provided with a residual material removing tube 57a so as to obliquely protrude downward, the residual material removing tube 57a removing granular material stored in the main storing unit 57 when material is exchanged as shown in FIG. 6. An open-close cap is provided so as to be capable of opening or closing the lower end opening of the residual material removing tube 57a.

The lower end opening of the main storing unit 57 is opened toward a main material supply chute 58 extending vertically in the supply tube 50. The granular material stored in the main storing unit 57 is supplied so as to naturally fall by the gravity toward the main material supply chute 58.

The main material supply chute 58 is formed so as not to interfere the inserted gauge box 55. The main material supply chute 58 is formed in such a manner that the lower end of the main material supply chute 58 is positioned at the lower end of the supply tube 50. The main storing unit 57 can be provided with a material sensor (level gauge) for detecting reduction of the storage level of the granular material in the main storing unit 57 and outputting material request signal (no-material signal). A material collector for collecting the granular material pneumatically transported from a material source such as a material tank can be provided on the main storing unit 57 in such a manner that granular material can be resupplied to the main storing unit 57 from the collector.

In the blending and supplying apparatus A provided with the blending apparatus main body 5 as mentioned above, granular material stored in the main storing unit 57 is supplied to a downstream side of the supply tube 50 via the main supply chute 58 housed in the supply tube 50. The granular material fed from the supplying apparatuses 1, 1A is supplied to the downstream side via the supply tube 50. Then supplied granular material joins together at the lower end of the supply tube 50, is blended, and is supplied to the injection molding machine 4, the supply destination.

The blending apparatus main body 5 can be provided with a control panel for controlling the supplying apparatuses 1, 1A, to be mentioned later.

Next explained is one example of the apparatuses for supplying granular material 1, 1A equipped with the blending apparatus main body 5 of the present embodiment.

The supplying apparatuses 1, 1A have storing units 49, 49 for storing granular material, feeding units 30, 30A provided under the storing units 49, 49, driving units 20, 20 connected with the feeding units 30, 30A for driving the feeding units 30, 30A, and supporting units 10, 10 fixed to the blending apparatus main body 5 for supporting the units 49, 20, 30, respectively. The configurations of the supplying apparatuses 1, 1A are almost the same, therefore the common configurations are explained exemplifying the supplying apparatus 1 in the following explanation.

In this embodiment, the supporting unit 10 is fixed to the fixing portion 51 provided for the side wall of the supply tube 50 of the blending apparatus main body 5. In the figures, a connection tube 14 is provided on the supply tube 50 side of the supporting unit 10 and the supporting unit 10 is fixed to the supply tube 50 in such a manner that a flange portion provided at the tip end of the connection tube 14 (end on the supply tube 50 side) is connected to the fixing portion 51 of the supply tube 50 by a fastening means such as a bolt (also refer to FIG. 4).

Instead of fixing the supporting unit 10 to the supply tube 50 in a cantilever manner, the blending apparatus main body 5 can be provided with a frame to which the supporting unit 10 is fixed and the supporting unit 10 can be fixed to the blending apparatus main body 5 so as not to contact the inlet opening 51a of the supply tube 50. In addition, the fixing manner of the supporting unit 10 to the blending apparatus main body 5 is not limited to the above-mentioned one and several fixing manners are possible.

The supporting unit 10 is formed with a space 11 (concave for receiving the feeding unit) for receiving the feeding unit 30 as shown in FIG. 1 to FIG. 4. On the base end side of the connection tube 14 of the supporting unit 10, back and forth side walls extending in the direction opposite to the supply tube 50 (opposite to the supply destination, on the driving unit 20 side at a coupling position, to be mentioned later) are continuously provided. Upper supporting pieces 12, 12 are provided so as to protrude facing each other from the upper end edges of the side walls; lower engaging pieces 13, 13 are provided so as to protrude facing each other from the lower end edges of the side walls. The side walls, the upper supporting pieces 12, 12 and the lower engaging pieces 13, 13 define a concave which opens up and down and opens opposite to the supply tube 50. The concave and the connection pipe 14 define the space for receiving the feeding unit 11.

The supporting unit 10 is provided with a fixing member 15 detachably fixing the feeding unit 30 from the supporting unit 10. In this embodiment, fastening members 15, 15 are provided as a fixing member for the side walls at back and forth of the supporting unit 10, respectively. The fastening members 15, 15 have an arm to be hung on a hook-like receiver 42 provided on the feeding unit 30 side and an operation lever for fastening the arm hung with the receiver 42. An adjuster fastener capable of controlling fastening degree can be used as the fastener 15. The fixing manner for detachably fixing the feeding unit 30 from the supporting unit 10 is not limited to the above-mentioned one. For example, a swing bolt can be rotatably connected on the supporting unit 10 side, a female screw can be provided for screwing the swing bolt therein, and a cut-out can be provided on the feeding unit 30 side for receiving the head of the swing bolt. Other fixing manners can also be applied.

The driving unit 20 is supported by the supporting unit 10 so as to be freely displaced between a coupling position where the driving unit 20 is coupled to the feeding unit 30 and a retracting position where coupling of the driving unit 20 with the feeding unit 30 is released and the feeding unit 30 is removable from the supporting unit 10.

The driving unit 20 is provided so as to be connected on the outer side of the supporting unit 10 (opposite to the supply tube 50, namely opposite to the supply destination). The driving unit 20 has a box-like mounting portion 21 which opens toward the supporting unit 10 at the coupling position and a driving motor 24 fixed on the outer side of the mounting portion 21.

In this embodiment, a part of the driving unit 20 is rotatably coupled with the supporting unit 10 via the coupling member 19 and the driving unit 20 is able to be displaced between the coupling position and the retracting position by rotating the driving unit 20. In the figures, one mounting blade of the coupling member 19, being a hinge, is attached to one side wall (rear wall in the figures) of the supporting unit 10 with a fastening means such as a bolt; another blade is attached to a part (rear side in the figures) of the mounting portion 21 of the driving unit 20 with a fastening means such as a bolt. The driving unit 20 is rotatably coupled to the supporting unit 10 around a coupling shaft which couples mounting blades of the coupling member 19.

Figure 4A:
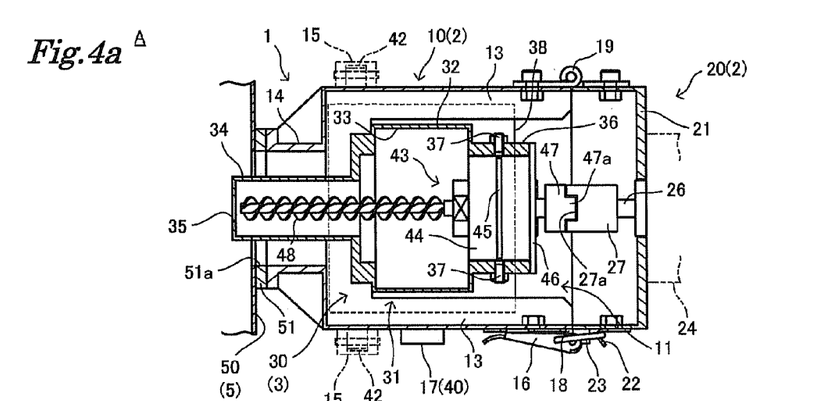
FIG. 4a diagrammatically shows a partially broken transverse section along an arrow X-X in FIG. 5, and FIG. 4b diagrammatically shows a partially exploded transverse section in which a part of the view corresponding to FIG. 4a is broken.

As shown in FIG. 4a, when the driving unit 20 is at the coupling position, the outer side opening of the feeding unit receiving recess 11 of the supporting unit 10 is closed by the driving unit 20 (the mounting portion 21).

Figure 4B:
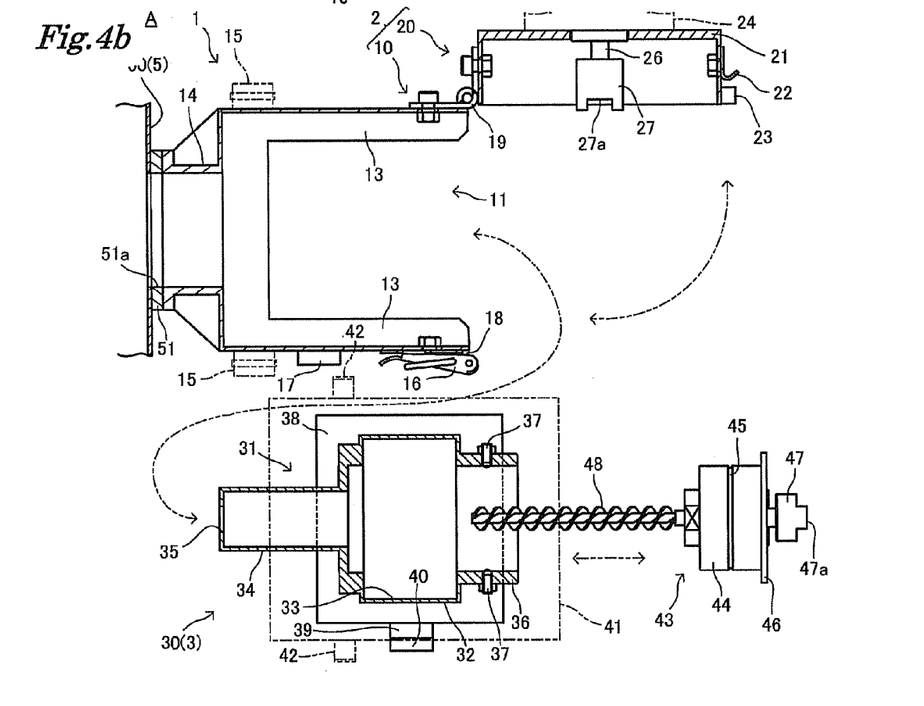

On the other hand, when the driving unit 20 is at the retracting position as shown in FIG. 4b, the outer opening of the feeding unit receiving recess 11 of the supporting unit 10 is provided, thereby enabling removal or attachment of the feeding unit 30 to be mentioned later.

Another side wall (front wall in the figures) of the supporting unit 10 is provided with a fixing member 16 detachably fixing a part (the other part, namely front part in the figures), opposite to the coupling member, of the driving unit 20 relative to the supporting unit 10. The fixing member 16 is a fastening means (fastener) as mentioned above and another side of the mounting portion 21 of the driving unit 20 is provided with the hook-like receiver 22 to which the arm of the fastener 16 is hung. The fixing manner of detachably fixing another side of the driving unit 20 to the supporting unit 10 is not limited to the above-mentioned one. An embodiment using a swing bolt or a cut-out as mentioned above can be used and other several fixing manners can be applied.

Another side wall of the supporting unit 10 and another part of the mounting portion 21 of the driving unit 20 are provided with sensors for driving unit sensors 18, 23 detecting whether the driving unit 20 is at the coupling position or not. The figures exemplify a non-contact proximity sensor. Providing the driving unit sensors 18, 23, error message is able to be outputted in case that the driving unit 20 is not at the coupling position. The sensor is not limited to the non-contact sensor. The contact sensor as mentioned above can also be used.

The mounting portion 21 of the driving unit 20 is formed with an opening through which an output shaft (motor shaft) 26 of the driving motor 24 is inserted as shown in FIG. 4.

The tip end of the output shaft 26 of the driving motor 24 is provided with a coupling block 27 which is engaged with the screw portion 43 of the feeding unit 30, to be mentioned later, and couples the driving unit 20 and the feeding unit 30, as shown in FIG. 4. The coupling block 27 is fixedly provided for the output shaft 26 and is substantially cylindrical in coaxial with the output shaft 26. The tip end face of the coupling block 27 is provided with an engaging recess 27a which is open toward the tip side (on the supply tube 50 side) and is engaged with the screw portion 43 of the feeding unit 30.

The reference numeral 25 in the figures refers to a power line for supplying electricity to the driving motor 24 of the driving unit 20.

In this embodiment, the supporting unit 10 and the driving unit 20 are constituted as one support-drive unit 2, and the support-drive unit 2 can be provided for the supplying apparatus 1 and another support-drive unit 2 constituted with the same member as the support-drive unit 2 for the supplying apparatus 1 can be provided for the supplying apparatus 1A. In the figures, the rear side of the driving unit 20 is rotatably coupled with the rear wall of the supporting unit 10 of the support-drive unit 2 of the supplying apparatus 1A, and the support-drive unit 2 of the supplying apparatus 1A and that of the supplying apparatus 1 are not constituted in the same manner. In such an embodiment, when the coupling member 19 is reversely provided relative to the fixing member 16, the receiver 22 and the sensors 18, 23, each support-drive unit 2 is able to be formed with the same member. Instead of the embodiment, the support-drive unit 2 of the supplying apparatus 1A and that of the supplying apparatus 1 can be constituted in the same manner. Namely, the supplying apparatuses 1, 1A can be horizontally reversed in FIG. 5. In addition, instead of the embodiment in which the support-drive units 2, 2 of the supplying apparatus 1, 1A are formed with the same member, the support-drive units 2, 2 can be formed with different members.

The feeding unit 30 coupled with the driving unit 20 is driven by the driving unit 20 at the coupling position and is adapted to feed granular material stored in the storing unit 49 to the supply tube 50.

Figure 1:
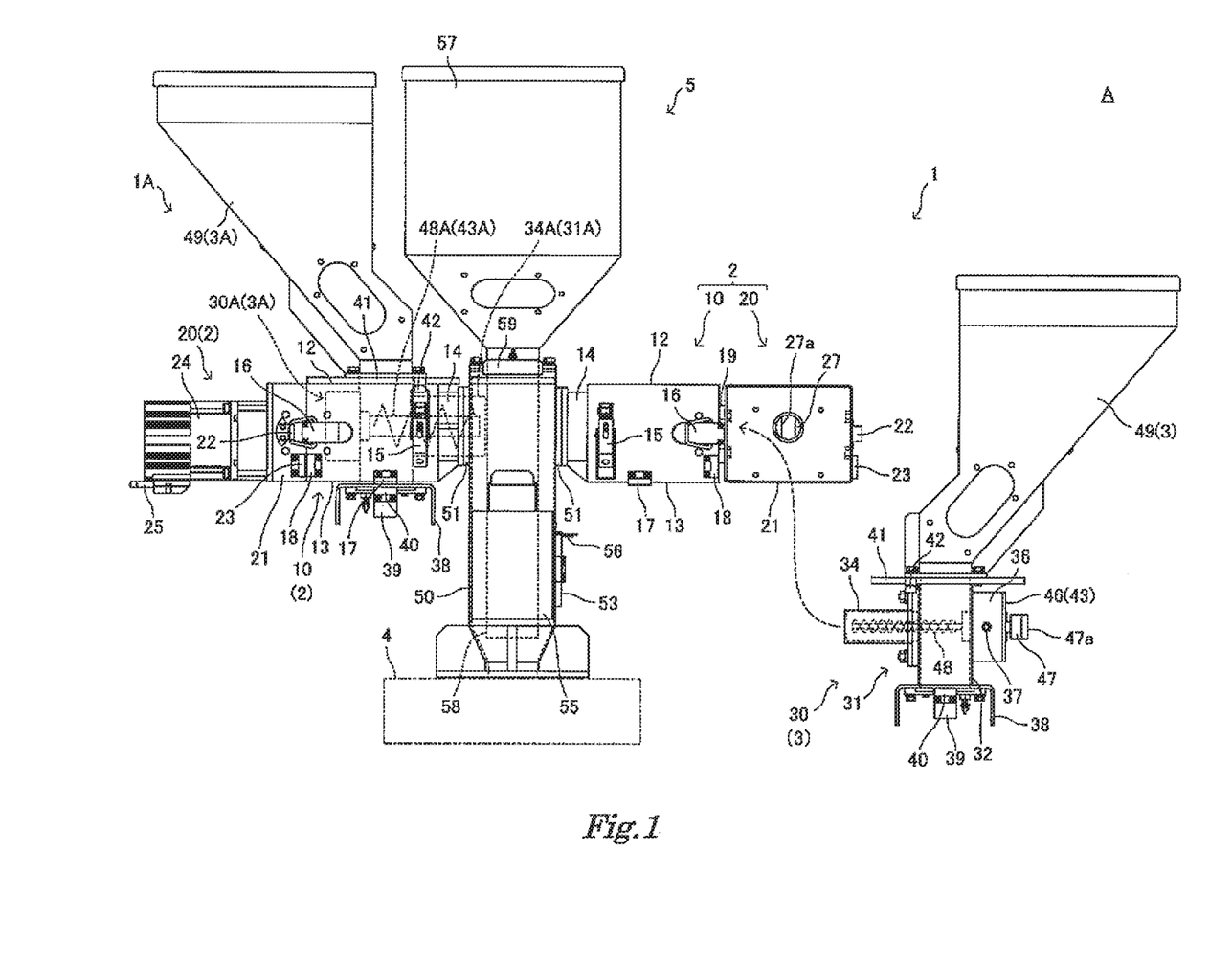
FIG. 1 is a partially exploded front view diagrammatically showing one example of an apparatus for blending and supplying granular material equipped with an apparatus for supplying granular material in one embodiment of the present invention.
Figure 2:
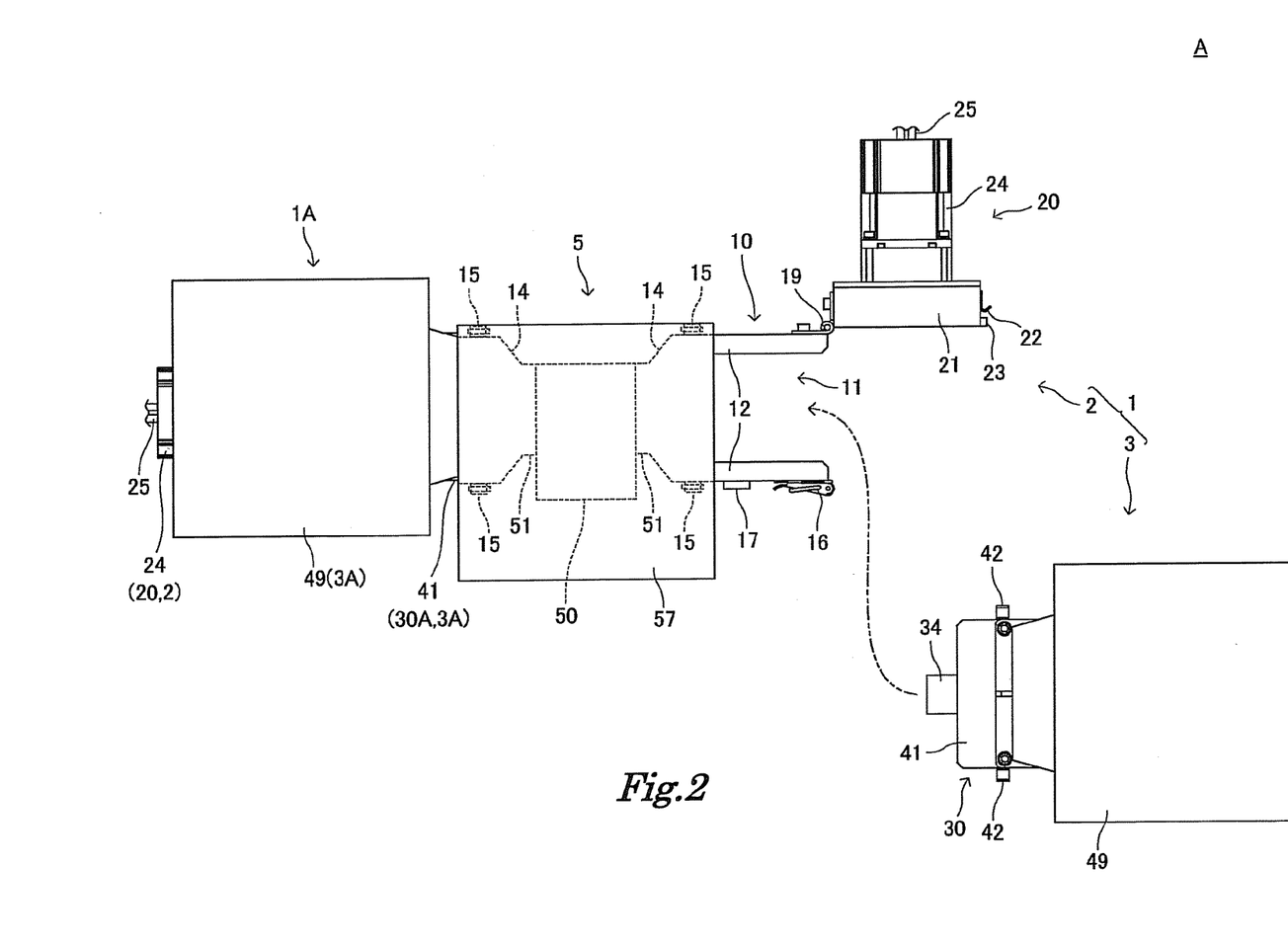
FIG. 2 is a partially exploded diagrammatic plan view of the blending and supplying apparatus.
Figure 3:
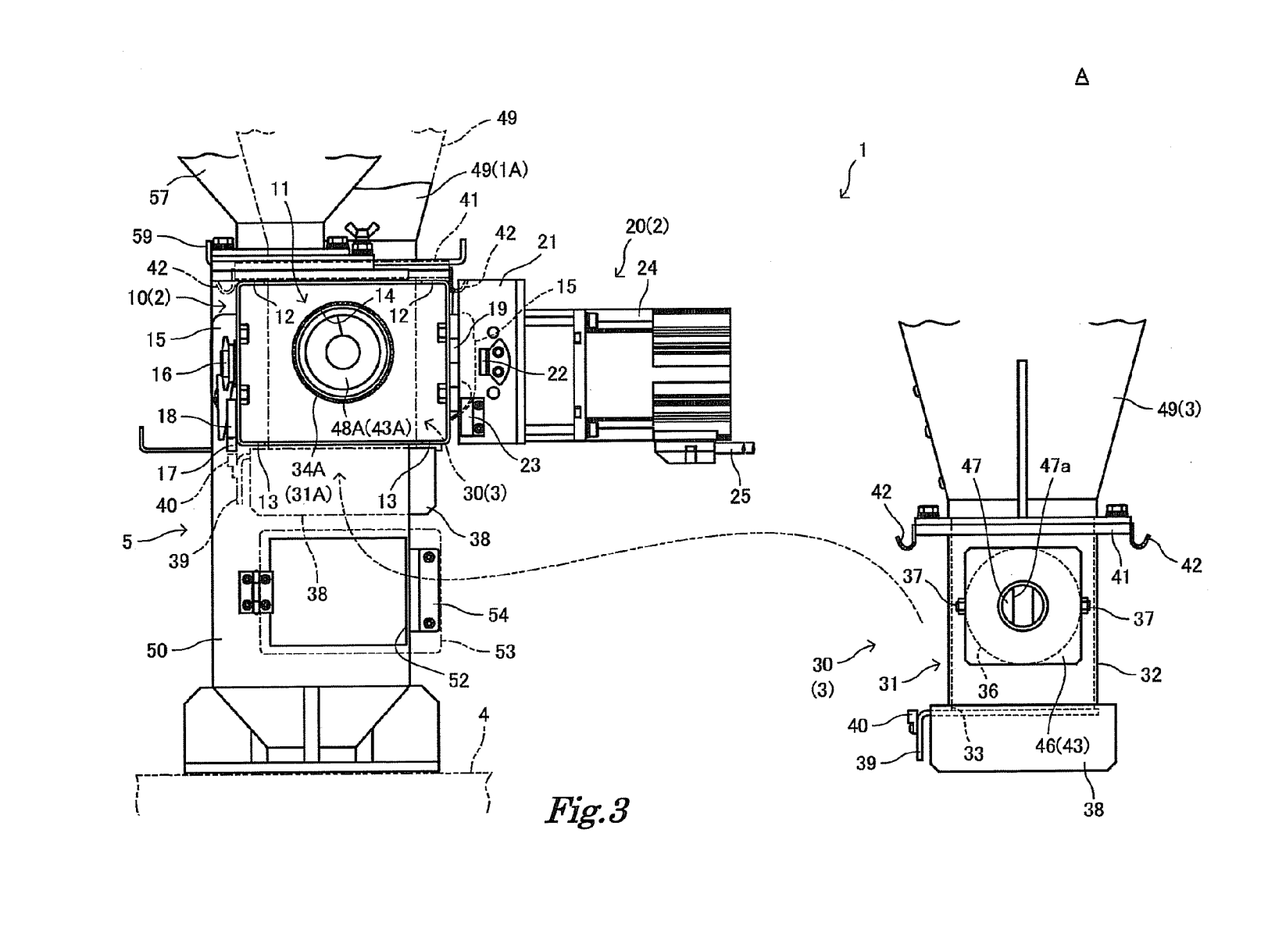
FIG. 3 is a partially exploded diagrammatic side view in which a part of the blending and supplying apparatus is broken.

In this embodiment, the feeding unit 30 is fixedly connected with the lower side of the storing unit 49 as shown in FIG. 1 and FIG. 3. The feeding unit 30 and the storing unit 49 constitute one unit, a storing-feeding unit 3. The storing-feeding unit 3 is supported by the supporting unit 10 so as to be detached from the supporting unit 10 when the driving unit 20 is at the retracting position.

In this embodiment, as shown in FIG. 4, the feeding unit 30 has a screw portion 43 having a screw 48 which is connected to the driving unit 20 (the driving motor 24) so as to be rotatably driven, and a screw housing 31 housing the screw portion 43. In this embodiment, the feeding unit 30 is screw-type (a screw feeder).

The screw housing 31 defines a supply path of granular material so as to communicate the storing unit 49 and the supply tube 50 (the supply destination) and houses the entire screw 48 of the screw portion 43. By such a configuration, granular material in the storing unit 49 is supplied to the supply tube 50 (the supply destination) without falling in the supporting portion 10 via the feeding unit 30 (the screw housing 31).

The screw housing 31 and the screw portion 43 are provided with engagement portions 37, 45, respectively. The engagement portions 37, 45 are able to be engaged with each other, the screw portion 43 being able to be detached from the screw housing 31 by releasing the engagement.

The screw housing 31 is provided almost directly under the lower end opening of the storing unit 49 in this embodiment as shown in FIG. 1, FIG. 3, and FIG. 4. The screw housing 31 has a chute portion for receiving granular material falling by gravity from the storing unit 49, the tip end tube portion 34 provided on the tip end side of the chute portion (on the supply tube 50 side) and a base end tube portion 36 provided on the base end side of the chute portion (on the driving unit 20 side at the coupling position, namely on the outward side).

The chute portion is formed like a substantially rectangular tube of which top and bottom are open. The dimension of the chute portion in the back and forth direction (right-left dimension in FIG. 3) is adapted to correspond to the dimension between the upper supporting pieces 12, 12 and the lower engaging pieces 13, 13 provided on the upper and lower parts of the back and forth walls of the supporting unit 10 as shown in FIG. 3. The tip end tube portion 34 and the base end tube portion 36, both being substantially cylindrical, are connected to the right and left side walls of the chute portion, respectively.

A fixing plate 41 is provided at the upper end portion of the chute portion and is supported so as to be placed on the upper supporting pieces 12, 12 of the supporting unit 10. The back-and-forth dimension of the fixing plate 41 is almost the same as that of the supporting unit 10. The hook-like receivers 42, 42 are provided on the front and the back of the fixing plate 41, respectively and are hooked with the arms of the fasteners 15, 15 provided on the back and forth walls of the supporting unit 10.

In this embodiment, the feeding unit 30 is connected with the residual material removing portion 32 which is formed with the residual material removing hole 33 and an open-close member 39 for opening or closing the residual material removing hole 33. In the figures, the residual material chute 32 is formed as the residual material removing portion and the chute portion of the screw housing 31 is extended downward. Namely, the chute portion of the screw housing 31 and the residual material chute 32 are integrally formed up and down.

The residual material removing hole 33 opening downward is formed at the lower end of the residual material chute 32. In the figures, the open-close member 39 for opening or closing the residual material removing hole 33 is constituted as an open-close shutter 39 which slides substantially orthogonal to the falling direction of granular material by gravity to open or close the residual material removing hole 33. The open-close member 39 for opening or closing the residual material removing hole 33 is not limited to the slide-type open-close shutter 39 as shown in the figures. The open-close member 39 can be an open-close door rotatable by means of a coupling member such as a hinge and other open-close members can be used.

In this embodiment, the open-close shutter 39 and the supporting unit 10 are provided with sensors 17, 40 for open-close shutter (open-close member) for detecting whether or not the open-close shutter 39 is at the closed position closing the residual material removing hole 33. In the figures, the open-close shutter sensor 17 is provided for another side wall (front wall) of the supporting unit 10 and the open-close shutter sensor 40 is provided for a handle of the open-close shutter 39, the sensor being the non-contact proximity sensor as mentioned above. Providing the open-close shutter sensors 17, 40, error message is able to be outputted in case that the open-close shutter 39 is not at the closed position. The sensor is not limited to the non-contact sensor and the contact sensor as mentioned above can be used.

The lower end of the residual material chute 32 is provided with an engaging pedestal 38 engaged with the lower engaging pieces 13, 13 of the supporting unit 10. The back-and-forth dimension of the engaging pedestal 38 is adapted to be larger than that of the chute portion (residual material chute 32) of the screw housing 31. The engaging pedestal 38 and the fixing plate 41 provided on the upper end of the screw housing 31 hold the supporting unit 10 up and down, thereby engaging the feeding unit 30 with the supporting unit 10. Drooping pieces formed so as to hang downward are provided at left and right edges of the engaging pedestal 38, respectively. The drooping pieces of the engaging pedestal 38 are adapted to prevent contact of the open-close shutter 39 and the mounting surface when the feeding unit 30 (storing-feeding unit 3) detached from the supporting unit 10 is placed on a mounting surface such as a work table or a floor. The drooping pieces of the engaging pedestal 38 are formed so as to safely place the feeding unit 30 (storing-feeding unit 3) detached from the supporting portion 10 on the mounting surface in the substantially same manner as being mounted on the supporting unit 10. Such a configuration improves efficiency in cleaning and maintenance of the feeding unit 30 (storing-feeding unit 3) detached from the supporting unit 10.

As shown in FIG. 4a, the tip end tube portion 34 is inserted into the connection tube 14 of the supporting unit 10 and the tip end is arranged so as to face the inside of the supply tube 50 via the inlet opening 51a of the supply tube 50 under the condition that the feeding unit 30 (storing-feeding unit 3) is mounted to and supported by the supporting unit 10.

The tip end tube portion 34 is provided with a supply port 35 for supplying granular material toward the supply tube 50. The figures exemplify that the supply port 35 is opened toward the tip side and is provided at the tip end of the tip end tube portion 34. Instead of such an embodiment, the supply port having a downward opening can be provided on the circumferential surface of the tip end tube portion 34. In the figures, the tip end tube portion 34 is provided so as to extend in the horizontal direction substantially orthogonal to the falling direction of granular material by gravity to be supplied to the chute portion. The tip end tube portion 34 can be inclined in such a manner that the tip end is higher than the coupling portion (base end) with the chute portion. In such a case, the shape of the connection tube 14 of the supporting portion 10 can be appropriately deformed depending on the shape of the tip end tube portion 34.

The tip end tube portion 34 has an inner diameter corresponding to the outer diameter of the screw 48 and functions as a trough for transferring granular material to the supply port 35 accompanying rotation of the screw 48.

The base end tube portion 36 opens outward and receives the screw portion 43 in the screw housing 31 via the opening.

The base end tube portion 36 is provided with an engagement portion 37 engaged with an engagement portion 45 provided for the screw portion 43. In this embodiment, the engagement protrusion 37 is constituted as a retractable engagement protrusion 37 retractable toward the center from the inner circumferential surface of the base end tube portion 36. In the figures, two retractable engagement protrusions 37, 37 are provided so as to face each other on the inner circumferential surface of the base end tube portion 36.

The retractable engagement protrusion 37 includes a ball plunger or a pin plunger in which a ball-like or a pin-like protrusion is projectably provided at the tubular tip end and is energized toward the projecting direction by means of an energizing member such as a spring. The present embodiment is not limited to the embodiment in the figures in which two retractable engagement protrusions 37, 37 are provided. Single, three or more retractable engagement protrusions can be provided.

FIG. 4 shows that the chute portion of the screw housing 31, the residual material chute 32, the tip end tube portion 34 and the base end tube portion 36 are integrally formed. However, all of them or some of them, being separate members, can be coupled and fixed by a fastening means such as a bolt or by welding.

The screw portion 43 has a bearing 44, a stopper plate 46 fixed on the outer side of the bearing 44 and a screw 48 rotatably supported on the outer side of the bearing 44, the bearing 44 being fitted and housed in the base end tube portion 36 of the screw housing 31. The bearing 44 has a rotary shaft which is provided coaxially with the output shaft 26 of the driving motor 24 of the driving unit 20 and is rotatably supported by a ball bearing provided in the bearing 44. The base end of the screw 48 is coupled with the rotary shaft of the bearing 44. The screw 48 is housed in the chute portion and the tip end tube portion 34 of the screw housing 31.

The rotary shaft provided for the bearing 44 has a region projecting outward from the outer side surface of the bearing 44. A coupling block 47 engaged with the coupling block 27 of the driving unit 20 is provided at the outer region of the rotary shaft. The coupling block 47, being substantially cylindrical and coaxial with the rotary shaft, is fixedly provided for the rotary shaft. The outer end surface of the coupling block 47 projects outward and has an engagement protrusion 47a to be engaged with the coupling block 27 of the driving unit 20. As shown in FIG. 4a, the engagement is extended in such a manner that the engagement protrusion 47a of the coupling block 47 of the screw portion 43 is fitted into the engaging recess 27a of the coupling block 27. Then the driving unit 20 and the screw portion 43 of the feeding unit 30 are coupled and rotation of the driving motor 24 of the driving unit 20 is adapted to be transmitted into the screw 48 of the screw portion 43. The engagement protrusion can be provided for the coupling block 27 of the driving unit 20 and the engaging recess to be fitted by the engagement protrusion can be provided for the coupling block 47 of the screw portion 43.

The outer circumference of the bearing 44 is provided with the engaging concave groove 45 engaged with the retractable engagement protrusions 37, 37 provided for the base end tube portion 36. In the figures, the engaging groove 45 is provided around the entire circumference along the circumferential direction of the bearing 44. When the retractable engagement protrusions 37, 37 of the base end tube portion 36 are engaged with the engaging groove 45, the screw portion 43 is attached to the screw housing 31. When the bearing 44 of the screw portion 43 is inserted so as to be fitted in the base end tube portion 36 of the screw housing 31, the retractable engagement protrusions 37, 37 of the base end tube portion 36 are regulated by the outer circumference of the bearing 44 and fully retracted. When the bearing 44 is further inserted and the engaging groove 45 of the bearing 44 reaches the retractable engagement protrusions 37, 37 of the base end tube portion 36, the regulation by the circumference of the bearing 44 is released. Then, the retractable engagement protrusions 37, 37 energized by the energizing member protrude and are engaged with the engaging groove 45 of the bearing 44. When the screw portion 43 is detached from the screw housing 31, the screw portion 43 is moved so as to be pulled out outward against the screw portion 31, thereby releasing engagement of the engagement protrusions 45, 37 and detaching the screw portion 43. The retractable engagement protrusions 37, 37 of the base end tube portion 36 are retracted by the outer circumference of the bearing 44 and the screw portion 43 is able to be smoothly detached.

The engagement portions 37, 45 provided for the screw housing 31 and the screw portion 43 are not limited to the above-mentioned ones. Other engagement portions can be used as far as the screw portion 43 is able to be engaged with the screw housing 31 or detached from the screw housing 31 by releasing the engagement.

When the feeding unit 30 is attached to the supporting unit 10 and the driving unit 20 is at the coupling position, movement to the tip side (on the supply tube 50 side) of the screw portion 43 is regulated with the stopper plate 46 abutting the base end tube portion 36; movement to the outside of the screw portion 43 (on the driving unit 20 side) is regulated by the coupling block 27 of the driving unit 20. The above-mentioned engagement portions 37, 45 may not be provided for the screw housing 31 or the screw portion 43; however, it is preferable that they are provided in view of safety and efficiency in maintenance, cleaning and replacement.

The storing unit 49 is formed like a hopper of which lower part is tapered. The flange portion provided at the lower end of the storing unit 49 is fixed to the fixing plate 41 provided at the upper end of the feeding unit 30 by means of a fastening means such as a bolt. A material sensor (level gauge) can be provided for the storing unit 49, the sensor detecting reduction of the storage level of granular material in the storing unit 49 and outputting material request signal (no-material signal). A collector can be provided on the storing unit 49 for collecting granular material pneumatically transported from the material source such as a material tank and granular material can be resupplied from the collector to the storing unit 49.

Next, the difference between the supplying apparatus 1 and the supplying apparatus 1A is explained.

In the supplying apparatus 1A, the tip end tube portion 34A of the screw housing 31A of the feeding unit 30A and a screw 48A of the screw portion 43A are mainly different from the tip end tube portion 34 of the screw housing 31 of the feeding unit 30 and a screw 48 of the screw portion 43 of the supplying apparatus 1.

The diameter of the screw 48A of the supplying apparatus 1A is larger than that of the screw 48 of the above-mentioned supplying apparatus 1 as shown in FIG. 3 and FIG. 5. The tip end tube portion 34A of the supplying apparatus 1A has an inner diameter corresponding to the outer diameter of the screw 48A and has a larger diameter than that of the tip end tube portion 34 of the supplying apparatus 1.

The supplying apparatuses 1, 1A use the feeding units 30, 30A which have different feeding amount per unit time (feeding capability), respectively.

In the above-mentioned supplying apparatuses 1, 1A, the feeding units 30, 30A (storing-feeding units 3, 3A) can be detached from the supporting unit 10 as follows, for example.

The fastener 16 of the supporting unit 10 and the receiver 22 of the driving unit 20 are released, the driving unit 20 is rotated around the supporting unit 10, and the driving unit 20 is positioned at the retracting position. The fasteners 15, 15 provided back and front of the supporting unit 10 are released from the receivers 42, 42 of the feeding unit 30 (30A).

Then, the feeding unit 30 (30A) can be pulled out and detached outside from the supporting unit 10.

When the feeding unit 30 (30A), namely the storing-feeding unit 3 (3A), is attached to the supporting unit 10, the driving unit 20 is placed at the retracting position, and the feeding unit 30 (30A) is inserted into the feeding unit receiving recess 11 of the supporting unit 10, in an opposite manner mentioned above, thereby the feeding unit 30 (30A) is engaged with the supporting unit 10. In addition, the fasteners 15, 15 provided back and front of the supporting unit 10 are fixed with the receivers 42, 42 of the feeding unit 30 (30A). The driving unit 20 is rotated around the supporting unit 10 and is placed at the coupling position, then the fastener 16 of the supporting unit 10 and the receiver 22 of the driving unit 20 are fixed.

Under the condition that the feeding units 30, 30A (storing-feeding units 3, 3A) are attached to the supporting units 10, 10 and are coupled with the driving units 20, 20, the driving motors 24, 24 of the driving units 20, 20 are driven. Then, granular material stored in the storing units 49, 49 is able to be supplied to the supply tube 50.

The feeding units 30, 30A are capable of changing the feeding amount per unit time (feeding capacity) by changing the rotation number per unit time of the driving motors 24, 24 of the driving units 20, 20 (the rotation speed of the driving motors 24, 24 and motion output to the driving motors 24, 24). Namely, the feeding capacity of the feeding units 30, 30A is changed by the rotation number per unit time of the driving motors 24, 24 of the driving units 20, 20, thereby the supplying apparatuses 1, 1A are able to change supply amount per unit time (supply capacity). The supply capacity of the supplying apparatuses 1, 1A can be changed by input from an operation panel provided for a control panel in such a manner that the desirable blending ratio of granular material supplied from the supplying apparatuses 1, 1A is achieved.

CPU can be provided as a control unit for a control panel of the blending and supplying apparatus A equipped with the supplying apparatuses 1, 1A. In addition to the above-mentioned units, the CPU can control resupply of granular material from the material source to the storing units 57, 49, 49 of the blending and supplying apparatus A and blend and supply (gauging) of the blending and supplying apparatus A following a predetermined program.

Initial measured data can be stored in advance in a memory of the control panel. The measured data show the relation of the rotation number (rotation speed) of the driving units 20, 20 and supply amount per unit time (supply capacity) of the feeding units 30, 30A of the supplying apparatuses 1, 1A. The relation of the rotation number (rotation speed) and the supply amount per unit time (supply capacity) vary depending on the kinds of granular material. Therefore, granular material stored in the supplying apparatuses 1, 1A can be measured by the above-mentioned gauging box 55 and the above-mentioned initial measured data set in advance can be updated. Blending and supplying can be executed after the rotation number of the feeding units 30, 30A is set in such a manner that the blending ratio of granular material supplied from the supplying apparatus 1, 1A becomes desirable based on the measured data.

The supplying apparatuses 1, 1A equipped with the blending and supplying apparatus A in the above-mentioned embodiment is able to improve the efficiency in cleaning, maintenance and replacement. The driving unit 20 coupled with the feeding unit 30 (30A) for driving the feeding unit 30 (30A) is supported by the supporting unit 10 so as to be freely displaced between the coupling position and the retracting position. When the driving unit 20 is at the retracting position, the feeding unit 30 (30A) is able to be easily detached from the supporting unit 10 fixed to an object to be installed, thereby improving efficiency in cleaning, maintenance and replacement of the feeding unit 30 (30A). Operation is able to be executed without detaching the driving unit 20 connected with the control panel with an electric power line or a signal line from the supporting unit 10, thereby further improving the efficiency. When the feeding unit is fixed to an object to be installed, a rotating body such as a screw of the feeding unit can be detached opposite to the driving unit for facilitating cleaning. In such a case, an open-close door for detaching the rotating body such as a screw is required to be provided for the object to be installed or the supporting unit, and cleaning and maintenance of a housing containing the rotating body such as a screw become difficult. On the other hand, in the above-mentioned supplying apparatuses 1, 1A equipped with the blending and supplying apparatus A of the above-mentioned embodiment, when the driving unit 20 is at the retracting position, the feeding unit 30 (30A) is able to be easily detached from the supporting unit 10 fixed to the object to be installed, thereby remarkably improving efficiency in cleaning, maintenance and replacement of the feeding unit 30 (30A).

When the feeding unit 30 (30A) is provided directly on the injection molding machine 4 as shown in the figures, operation in cleaning and maintenance becomes difficult. However, in the supplying apparatuses 1, 1A equipped with the blending and supplying apparatus A of the embodiment of the present invention as mentioned above, cleaning and maintenance are facilitated when the feeding unit 30 (30A) is detached from the supporting unit 10, thereby achieving a preferable supplying apparatus or a preferable blending and supplying apparatus provided directly on the injection molding machine 4.

The supplying apparatuses 1, 1A of the blending and supplying apparatus A of the embodiment of the present invention is able to improve efficiency in cleaning, maintenance and replacement, thereby achieving a preferable blending and supplying apparatus for plural kinds of granular material in which material exchange is frequently executed.

In this embodiment, the residual material chute (residual material removing portion) 32 is connected with the feeding unit 30 (30A). Therefore, the residual material chute 32 and the feeding unit 30 (30A) are able to be detached from the supporting unit 10. For example, compared with the embodiment in which the residual material removing portion is separately provided from the feeding unit, cleaning of the residual material removing portion to which granular material and minute powder are easily attached is able to be facilitated. Instead of such an embodiment, the supporting unit 10 can be provided with a residual material removing portion provided with a residual material removing hole and an open-close member for opening or closing the residual material removing hole. The feeding unit can be provided with an opening toward the residual material removing hole. Otherwise, the above can be executed without providing the residual material removing portion.

In this embodiment, a part of the driving unit 20 is rotatably supported by the supporting unit 10 via the coupling member 19 and the driving unit 20 is freely displaced between the coupling position and the retracting position. Compared with the embodiment in which the driving unit is slidable relative to the supporting unit between the coupling position and the retracting position, a space required for detaching the feeding unit 30 (30A) is able to be reduced. In addition, compared with the slidable embodiment, contact of the feeding unit 30 (30A) and the driving unit 20 is effectively inhibited when the feeding unit 30 (30A) is detached. Namely, when the driving unit is adapted to be slidable relative to the supporting unit between the coupling position and the retracting position, for detaching the feeding unit, the driving unit is required to retract by largely sliding relative to the supporting unit for inhibiting contact of the feeding unit and the driving unit. On the other hand, in the above-mentioned configuration, the driving unit 20 is rotated around the part thereof to be at the retracting position. Therefore, the driving unit 20 does not become an obstacle at the retracting position. When the feeding unit 30 (30A) is detached, the space required for detaching the feeding unit 30 (30A) is reduced. In addition, contact of the feeding unit 30 (30A) and the driving unit 20 is effectively avoided.

As illustrated in the figures, the rear wall of the supporting unit 10 and the rear side of the driving unit 20 are rotatably coupled by the coupling member 19. The upper regions of the coupled units or the lower regions of the coupled units can be rotatably coupled by a coupling member. Instead of rotatably coupling the driving unit 20 to the supporting unit 10, for example, the driving unit 20 can be slidably supported by the supporting unit 10 in the outward direction (opposite to the supply tube 50 side) so as to be freely displaced between the coupling position and the retracting position.

In the embodiments of the present invention, the feeding unit 30 (30A) is fixedly provided so as to be connected to the lower side of the storing unit 49 in such a manner that the storing unit 49 and the feeding unit 30 (30A) are detachably supported by the supporting unit 10. In addition, when the driving unit 20 is at the retracting position, the storing unit 49 and the feeding unit 30 (30A) are detachable from the supporting unit 10. Therefore, the storing unit 49, together with the feeding unit 30 (30A), is able to be detached from the supporting unit 10, thereby facilitating cleaning in the storing unit 49. When the feeding unit 30 (30A) and the storing unit 49 are constituted as storing-feeding units 3, 3A, as mentioned above, with a plurality of storing-feeding units 3, 3A prepared, the storing-feeding units 3, 3A are provided for the supporting unit 10 and the driving unit 20 supported by the supporting unit 10 so as to be exchangeable like a cassette, thereby improving efficiency in material exchange. On the other hand, instead of such an embodiment, the storing unit 49 can be fixedly provided for the supporting unit 10 so as to freely detach or attach the feeding unit 30 (30A) from or to the supporting unit 10. In such a case, efficiency is improved in cleaning, maintenance and replacement of the feeding unit 30 (30A) which is easily attached with granular material and the minute particle and frequently requires maintenance.

In this embodiment of the present invention, the feeding unit 30 (30A) has the screw portion 43 (43A) and the screw housing 31 (31A). The screw portion 43 (43A) has the screw 48 (48A) which is coupled with the driving unit 20 so as to be rotatably driven, while the screw housing 31 (31A) houses the screw portion 43 (43A) and has the supply port 35. The screw housing 31 (31A) and the screw portion 43 (43A) are provided with engagement portions 37, 45, respectively. The engagement portions 37, 45 are able to be engaged with each other, and the screw portion 43 (43A) is able to be detached from the screw housing 31 (31A) by releasing the engagement. Therefore, the feeding unit 30 (30A) is able to be detached from the supporting unit 10 and the screw portion 43 (43A) having the screw 48 (48A) is able to be easily detached from the screw housing 31 (31A), thereby facilitating cleaning of the screw housing 31 (31A) and the screw portion 43 (43A). In addition, efficiency in maintenance and replacement of the screw portion 43 (43A) is further improved because the screw portion 43 (43A) is easily detached from the screw housing 31 (31A).

Furthermore, the screw portion 43 (43A) is prevented from being unintentionally detached from the screw housing 31 (31A) when the feeding unit 30 (30A) is detached from the supporting unit 10. On the other hand, the screw housing 31 and the screw portion 43 can be fixedly or detachably fastened by a fastening means without providing the engagement portions 37, 45.

In the above-mentioned embodiment, two supplying apparatuses 1, 1A are exemplified; however, three or more supplying apparatuses can be provided.

In addition, in the above-mentioned embodiment, the blending apparatus main body 5 having the main storing unit 57 is provided for the blending and supplying apparatus A and granular material stored in the main storing unit 57 is supplied via the main material supply chute 58 by gravity to the lower end of the supply tube 50, namely granular material is spontaneously fed. On the other hand, the above-mentioned operation can also be executed without providing such a main storing unit 57 and a main material supply chute 58. In such a case, the above-mentioned supplying apparatus can be additionally provided for main material. In addition, material can be supplied per one batch upon receiving material request signal from the supply destination without being continuously supplied from the supplying apparatus 1, 1A to the supply destination.

In the above-mentioned embodiment, the blending and supplying apparatus A is exemplified as an object to which the supplying apparatus 1, 1A is provided. On the other hand, the object to which the supplying apparatus 1, 1A is provided is not limited to the above-mentioned blending and supplying apparatus A. The supplying apparatus 1, 1A can be provided for several kinds of objects and one supplying apparatus can be provided for the object.

In addition, in the above-mentioned embodiment, the feeding unit 30 (30A) is exemplified as a screw feeder. The present invention is not limited to such an embodiment and the feeding unit can be a measuring feeder (rotary feeder) which feeds material by rotating a rotary body having therearound a concave portion (a measuring portion) containing material or a rotary valve for feeding material by rotating a rotary body having a plurality of projecting rotary vanes in the diametrical direction. In such a case, the above-mentioned screw housing can be appropriately deformed as a rotary body housing containing the rotary body.

A supporting manner of the feeding unit 30, 30A (storing-feeding unit 3, 3A) by the supporting unit 10 and a coupling manner of the driving unit 20 (driving motor 24) and the feeding unit 30, 30A (screw 48, 48A) are not limited to the above-mentioned embodiments and other manners are applicable to the embodiments.

REFERENCE SIGNS LIST

A apparatus for blending and supplying granular material
1, 1A apparatus for supplying granular material
10 supporting unit
11 feeding unit receiving recess (space for receiving feeding unit)
19 coupling member
20 driving unit
30, 30A feeding unit
31, 31A screw housing
32 residual material chute (residual material removing portion)
33 residual material removing hole
35 supply port
37 retractable engagement protrusion (engagement portion)
39 open-close shutter (open-close member)
43, 43A screw portion
45 engagement concave groove (engagement portion)
48, 48A screw
49 storing unit
5 blending apparatus main body (object to be installed)
50 supply tube (supply destination)
4 injection molding machine (supply destination)

The invention claimed is:

1. An apparatus for supplying granular material, comprising:
a storing unit for storing granular material;
a feeding unit for feeding granular material stored in said storing unit to a supply destination, said feeding unit being provided under the storing unit;
a driving unit coupled to said feeding unit for driving said feeding unit; and
a supporting unit forming a space for receiving said feeding unit, supporting said storing unit, said feeding unit and said driving unit, and being fixed to an object to be installed, wherein
said feeding unit comprises a screw portion having a screw that is connected to said driving unit and is rotatably driven, and a screw housing portion wholly housing said screw and having a supply port,
said supporting unit has a receiving recess which is a space for receiving said screw housing portion constituting said feeding unit in such a manner that said receiving recess opens towards a side opposite to said object to be installed which is a different side from a side to which said object to be installed is fixed, and
said driving unit is supported by said supporting unit so as to be freely displaced between a coupling position where said driving unit is coupled to said feeding unit and a retracting position where coupling of said driving unit with said feeding unit is released and said feeding unit is removable from said supporting unit in such a manner that a part of said driving unit is rotatably coupled via a coupling member to a part of said supporting unit which defines said receiving recess, and said driving unit is constituted in such a manner that an opening of said receiving recess is closed when said driving unit is at said coupling position and said opening of said receiving recess is opened when said driving unit is at said retracting position.

2. The apparatus for supplying granular material as set forth in claim 1, wherein said feeding unit is continuously connected with a residual material removing portion provided with a residual material removing hole and an open-close member for opening or closing said residual material removing hole.

3. The apparatus for supplying granular material as set forth in claim 1 or 2, wherein:
said feeding unit is fixedly provided so as to be connected on a downstream side of said storing unit, and said storing unit and said feeding unit are detachably supported to said supporting unit; and said storing unit and said feeding unit are removable from said supporting unit when said driving unit is at said retracting position.

4. The apparatus for supplying granular material as set forth in claim 1 or 2, wherein:

said screw housing portion and said screw portion have an engagement portion, respectively, said engagement portions engaging said screw housing portion and said screw portion and being capable of removing said screw portion from said screw housing portion by releasing the engagement.

5. An apparatus for blending and supplying granular material, comprising:

a plurality of said apparatuses for supplying granular material as set forth in claim 1 or 2, and a supply tube which receives granular material fed from a feeding unit of said apparatus for supplying granular material and supplies the received granular material.

6. The apparatus for supplying granular material as set forth in claim 4, wherein:

said feeding unit is fixedly provided so as to be connected on a downstream side of said storing unit, and said storing unit and said feeding unit are detachably supported to said supporting unit; and said storing unit and said feeding unit are removable from said supporting unit when said driving unit is at said retracting position.

7. An apparatus for blending and supplying granular material, comprising:

a plurality of said apparatuses for supplying granular material as set forth in claim 3, and a supply tube which receives granular material fed from a feeding unit of said apparatus for supplying granular material and supplies the received granular material.

8. An apparatus for blending and supplying granular material, comprising:

a plurality of said apparatuses for supplying granular material as set forth in claim 4, and a supply tube which receives granular material fed from a feeding unit of said apparatus for supplying granular material and supplies the received granular material.

9. An apparatus for blending and supplying granular material, comprising:

a plurality of said apparatuses for supplying granular material as set forth in claim 6, and a supply tube which receives granular material fed from a feeding unit of said apparatus for supplying granular material and supplies the received granular material.

* * * * *